(12) United States Patent
Hall et al.

(10) Patent No.: US 7,047,280 B2
(45) Date of Patent: May 16, 2006

(54) NETWORK SYSTEM AND METHOD FOR PROVIDING USER-RELATIVE ADDRESSING

(75) Inventors: John M. Hall, Boise, ID (US); Clint S. Cuzzo, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 09/810,281

(22) Filed: Mar. 15, 2001

(65) Prior Publication Data

US 2002/0133625 A1 Sep. 19, 2002

(51) Int. Cl.
*G06F 15/16* (2006.01)
*G06F 15/173* (2006.01)

(52) U.S. Cl. ............ 709/206; 709/207; 709/223; 709/224

(58) Field of Classification Search ............ 709/206, 709/223, 207, 245, 205
See application file for complete search history.

(56) References Cited

U.S. PATENT DOCUMENTS

| | | | | |
|---|---|---|---|---|
| 5,905,777 | A * | 5/1999 | Foladare et al. | 379/90.01 |
| 5,938,725 | A * | 8/1999 | Hara | 709/206 |
| 5,987,508 | A * | 11/1999 | Agraharam et al. | 709/217 |
| 6,154,839 | A * | 11/2000 | Arrow et al. | 713/154 |
| 6,438,583 | B1 * | 8/2002 | McDowell et al. | 709/206 |
| 6,442,589 | B1 * | 8/2002 | Takahashi et al. | 709/203 |
| 6,587,549 | B1 * | 7/2003 | Weik | 379/93.24 |
| 6,591,291 | B1 * | 7/2003 | Gabber et al. | 709/206 |
| 6,643,687 | B1 * | 11/2003 | Dickie et al. | 709/206 |
| 6,658,456 | B1 * | 12/2003 | Shimoosawa | 709/206 |
| 6,832,245 | B1 * | 12/2004 | Isaacs et al. | 709/206 |
| 2004/0030752 | A1 * | 2/2004 | Selgas et al. | 709/206 |

FOREIGN PATENT DOCUMENTS

| | | | |
|---|---|---|---|
| GB | 2311188 A | | 9/1997 |
| JP | 03113934 | * | 9/1989 |
| JP | 10-240648 | | 9/1998 |
| WO | WO99/36856 | | 7/1999 |
| WO | WO 00/77593 | * | 12/2000 |
| WO | WO00/77593 A2 | | 12/2000 |
| WO | WO 200176119 A2 | * | 10/2001 |

OTHER PUBLICATIONS

Hewlett-Packard, "HP Digital Senders 8100C and 9100C E-Mail Appliances", Hewlett-Packard Company, 4 pgs. (2000).
Hewlett-Packard, "HP 9100C Digital Sender Index to Security: Version 3.0", Hewlett-Packard Company, 4 pgs.
Hewlett Packard, "Index to Architecture—of the HP 9100C Digital Sender: Version 4.1", Hewlett-Packard Company, 8 pgs.
Hewlett-Packard, "HP 9100C Digital Sender Index to Configuration Help: Version 4.0", Hewlett-Packard Company, 4 pgs.

(Continued)

*Primary Examiner*—Saleh Najjar
*Assistant Examiner*—Benjamin Bruckart

(57) ABSTRACT

A system and method of providing user-relative addressing in a computer network environment includes associating a plurality of user-relative destinations with a corresponding plurality of actions. User identification information and a first user-relative destination are received. A first action in the plurality of actions associated with the first user-relative destination is identified. A first absolute destination is determined based on the first action and the user identification information.

21 Claims, 6 Drawing Sheets

OTHER PUBLICATIONS

Hewlett Packard, "HP 9100C Digital Sender Index to Demo Installation: Version 4.0", Hewlett-Packard Company, 4 pgs.

Hewlett Packard, "HP 9100C Digital Sender Index to Internet E-mail: Version 4.2", Hewlett-Packard Company, 5 pgs.

Hewlett-Packard, "HP 9100C Digital Sender User Guide", Hewlett-Packard Company, pp. 1-147.

Hewlett-Packard, "HP 9100C Digital Sender Administrator Guide", Hewlett-Packard Company, pp. 1-227.

Introduction to Slapd and Slurpd, from the SLAPD and SLURPD Adminstrator's Guide, Release 3.3, Apr. 30, 1996, available at http://www.umich.edu/dirvcs/idap/doc/guides/slapd/toc.html.

* cited by examiner

NETWORK SYSTEM AND METHOD FOR PROVIDING USER-RELATIVE ADDRESSING

THE FIELD OF THE INVENTION

The present invention generally relates to computer networks, and more particularly to a network device and method for providing user-relative addressing.

BACKGROUND OF THE INVENTION

In addition to using a personal computer (PC) for transferring data to a network, another option for transferring information to a network is a "digital sender". A digital sender is a network device that converts paper-based documents into electronic data. A digital sender includes a scanner for scanning in paper documents. The digital sender can send the electronic data by several methods, including via Internet e-mail and via facsimile (Fax) either through a network fax server or an Internet fax service provider.

One known manufacturer of different models of digital senders is Hewlett-Packard Company. Information regarding Hewlett-Packard digital senders is publicly available via Hewlett-Packard's website at www.hp.com. Information regarding Hewlett-Packard's digital senders is also provided in "HP 9100C Digital Sender User Guide," 1$^{st}$ ed., 1998, Pub. No. C1311-90910, and "HP 9100C Digital Sender Administrator Guide," 1$^{st}$ ed., 1998, Pub. No. C1311-90915, which are incorporated herein by reference.

A digital sender allows data to be transferred to the Internet with fewer steps than that required by a PC. The digital sender includes a keypad that allows a user to enter an e-mail address. A user can scan in a document, enter one or more e-mail addresses for the desired destinations, press a send button, and the digital sender automatically e-mails the information to the various destinations. The digital sender automatically logs onto an exchange server, and transmits an e-mail message with the scanned document attached, without any further user input required. Thus, a digital sender provides a more efficient means for transferring paper-based source information to the Internet.

In existing systems, to send an e-mail communication, a user specifies one or more absolute destinations for the communication. The absolute destinations are typically e-mail addresses or fax phone numbers. Some systems allow a user to enter a destination in the form of a name or other identifier of a person or group, and the systems automatically retrieve the e-mail address or addresses corresponding to the entered name or identifier. In these existing systems, destinations are absolute. In other words, there is a 1-to-1 correspondence between destinations and e-mail addresses. Each destination is mapped to a single e-mail address or set of e-mail addresses, regardless of the particular sender transmitting the communication. The mappings do not change based upon the person transmitting the communication.

It would be desirable for a network to provide a capability for users to specify user-relative destinations that vary depending upon the person sending information over the network.

SUMMARY OF THE INVENTION

The present invention provides a system and method of providing user-relative addressing in a computer network environment. A plurality of user-relative destinations are associated with a corresponding plurality of actions. User identification information and a first user-relative destination are received. A first action in the plurality of actions associated with the first user-relative destination is identified. A first absolute destination is determined based on the first action and the user identification information.

One aspect of the invention provides a network device configured to be coupled to a computer network having a directory server. The network device includes a receiver for receiving a communication including destination information and sender identification information. A memory stores search information identifying searches associated with sender-relative destinations. A controller is coupled to the receiver and the memory. The controller identifies whether the destination information specifies a sender-relative destination. The controller performs at least one search of the directory server based on the stored search information and the sender identification information if the destination information specifies a sender-relative destination. The controller identifies at least one absolute destination based on the performed search.

Another aspect of the invention provides a computer-readable medium having computer-executable instructions for performing a method of providing user-relative addressing in a computer network. A plurality of user-relative destinations are associated with a corresponding plurality of actions. A first user-relative destination and user identification information are received. A first action in the plurality of actions associated with the first user-relative destination is identified. A first absolute destination is determined based on the first action and the user identification information.

Another aspect of the invention provides a method of providing user-relative addressing in a computer network. A communication including destination information and sender identification information is received. The destination information includes a first sender-relative destination. It is determined whether the destination information specifies a sender-relative destination. A sender record is accessed based on the received sender identification information. Action information identifying a plurality of actions associated with a plurality of sender-relative destinations is provided. A first action in the action information is identified based on the received destination information. The first action is associated with the first sender-relative destination. A first attribute in the sender record is identified based on the first action and the received destination information. A first absolute destination is determined based on the first attribute.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
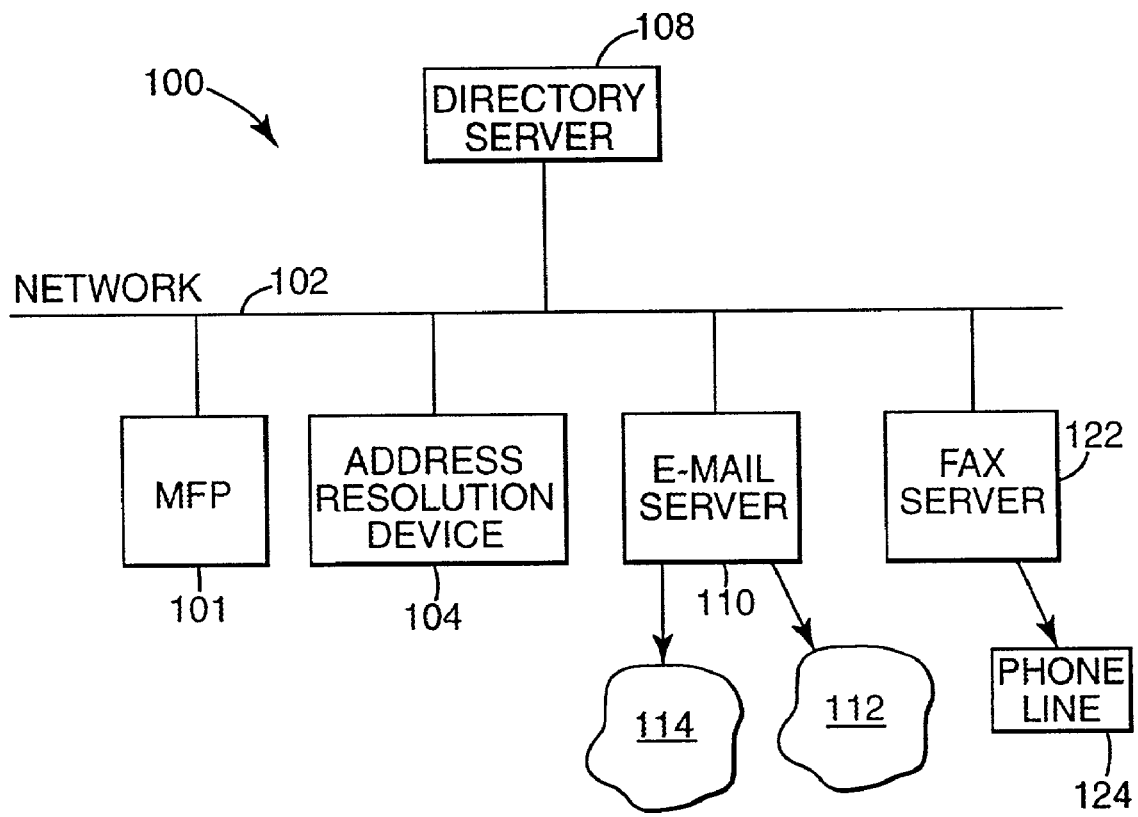
FIG. 1 illustrates a block diagram of a network, including a network device for providing user-relative destinations according to the present invention.

FIG. 1 illustrates a diagram of a network including a network device for providing user relative destinations according to the present invention. Network 100 includes multi-function peripheral (MFP) device 101, communication link 102, address resolution device 104, directory server 108, e-mail server 110, Internet 112, Internet fax service provider 114, fax server 122, and phone line 124. In one embodiment, multi-function peripheral device 101 is a digital sender device. In an alternative embodiment, multi-function peripheral device 101 is a personal computer (PC) or workstation. Multi-function peripheral device 101 may be any device capable of transmitting e-mail and/or fax communications. Address resolution device 104 is preferably a server computer or workstation. Address resolution device 104 provides absolute destination information based on relative destination information received from multi-function peripheral device 101. In one embodiment, directory server 108 is a light-weight directory access protocol (LDAP) server. In one embodiment, e-mail server 110 supports simple mail transport protocol (SMTP).

Multi-function peripheral device 101 allows users to send e-mail communications, with or without attachments, as well as fax communications. Multi-function peripheral device 101 preferably includes a keyboard or other input means for entering destination information, output format information, sender information, and subject information. The destination information specifies either an absolute destination, such as an e-mail address or fax phone number, or a user-relative destination. The destination information entered by a user may specify multiple destinations for each data item to be transmitted. The output format information identifies the format for items to be sent, including e-mail format, fax format and internet fax format. The sender information provides identifying information about the sender, such as a name or e-mail address. The subject information identifies a subject of data items to be transmitted.

E-mail addresses can be entered in multi-function peripheral device 101, or selected and retrieved from an internal address book stored in multi-function peripheral device 101. In addition, multi-function peripheral device 101 also supports LDAP queries, which provides the ability of real-time address queries. The LDAP capabilities are provided by directory server 108. User-relative e-mail destinations may also be entered in multi-function peripheral device 101.

Multi-function peripheral device 101 includes the capability to send faxes. Fax server 122 includes phone line 124 to fax communications received from multi-function peripheral device 101. Fax server 122 handles outbound dialing to fax communications received from multi-function peripheral device 101 over phone line 124. Fax numbers may be entered through a keyboard on multi-function peripheral device 101, or they can be retrieved from an internal fax address book stored in device 101. User-relative fax destinations may also be entered in multi-function peripheral device 101.

Multi-function peripheral device 101 is also capable of sending faxes via the Internet. To provide Internet fax capabilities, the user must subscribe to an Internet fax service provider service. E-mail server 110 provides Internet fax capabilities using Internet fax service provider 114. In order to transmit a document via Internet fax, multi-function peripheral device 101 transmits a communication via communication link 102 to e-mail server 110, which handles the Internet fax transmission. Absolute internet fax destinations and user-relative fax destinations may be entered in multi-function peripheral device 101.

Figure 2:
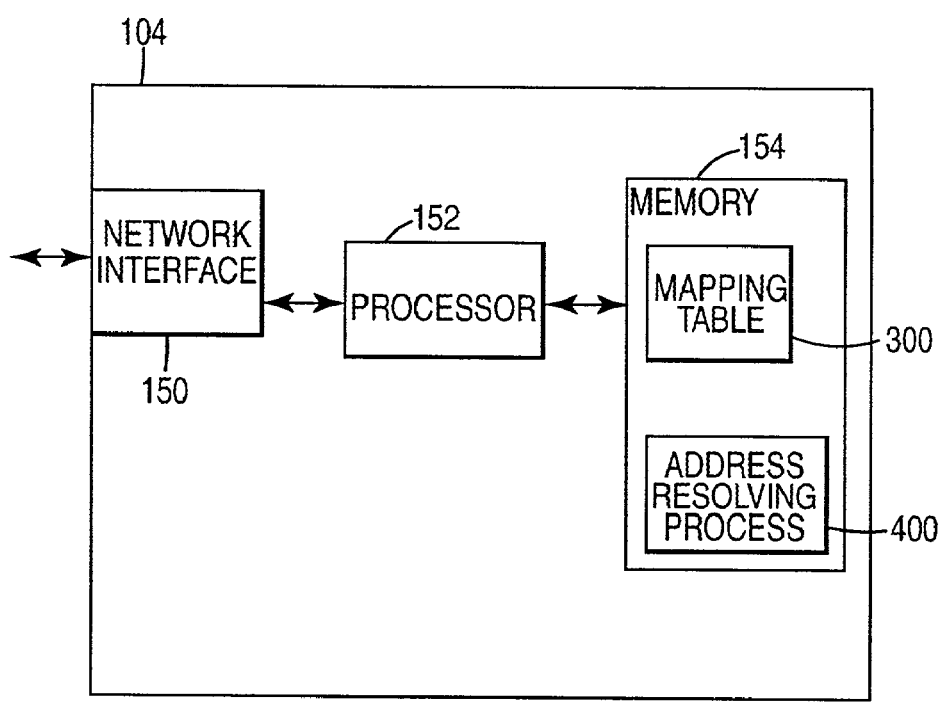
FIG. 2 illustrates an electrical block diagram of an address resolution device according to the present invention.

FIG. 2 illustrates an electrical block diagram of an address resolution device according to the present invention. Address resolution device 104 operates to provide absolute destination information based on received relative destination information. Address resolution device 104 includes network interface 150, processor 152, and memory 154. Memory 154 stores mapping table 300 and address resolving process 400. Network interface 150 is coupled to communication link 102 of network 100, and to processor 152. Address resolution device 104 receives communications from multi-function peripheral device 101, including sender information and destination information, through network interface 150. Network interface 150 passes the received communications on to processor 152. Processor 152 processes the received communications, and resolves addresses based on information stored in mapping table 300 (shown in detail in FIG. 3B) and address resolving process 400 (shown in detail in FIG. 4).

If a user-relative destination is specified by a sender, address resolution device 104 communicates with directory server 108 to resolve the user-relative destination, and identify one or more corresponding absolute destinations. Directory server 108 contains descriptive, attribute-based information. The service model of directory server 108 is based on entries. An entry is a collection of attributes that has a name, which is referred to as a distinguished name (DN). A DN uniquely identifies an entry. Each of the entry's attributes has a type and one or more values. Types are typically mnemonic strings, like "name" for a person's name, or "Email" for a person's email address. The values depend on what type of attribute it is. For example, an Email attribute might contain the value "joe@computer.com". In one embodiment, the directory entries in directory server 108 are arranged in a hierarchical tree-like structure.

Directory server 108 provides operations for interrogating and updating the directory. Operations are provided for adding and deleting an entry from the directory, changing an existing entry, and changing the name of an entry. Directory server 108 is also used to search for information in the directory. A search operation allows some portion of the directory to be searched for entries that match some criteria specified by address resolution device 104. Information can be requested from each entry that matches the criteria.

Figure 3A:
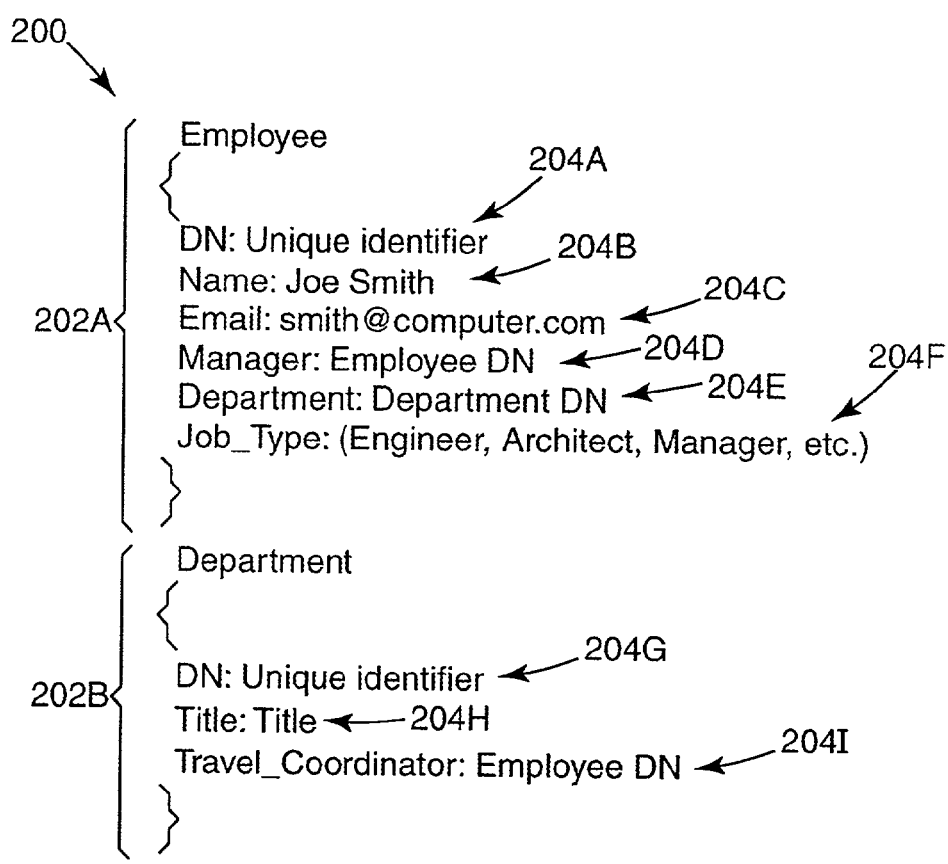
FIG. 3A illustrates examples of directory server entries.

FIG. 3A illustrates examples of directory server entries in directory server 108. Entries 200 in directory server 108 include entries 202A and 202B. Entries 202A and 202B include attributes 204A–204I (collectively referred to as attributes 204). In the embodiment shown, entry 202A is an "Employee" entry, and entry 202B is a "Department" entry. Employee entry 202A includes distinguished name (DN) attribute 204A, name attribute 204B, email attribute 204C, manager attribute 204D, department attribute 204E, and job_type attribute 204F. Department entry 202B includes DN attribute 204G, title attribute 204H, and travel_coordinator attribute 204I. Entry 202A is uniquely identified by its DN attribute 204A. Entry 202B is uniquely identified by its DN attribute 204G. Each attribute 204 includes a value. For example, the value for email attribute 204C might be "smith@computer.com", the value for job_type attribute 204F might be one of "Engineer", "Architect," or "Manager," and so on.

Entries 200 represent an employee record for a single employee, and are also referred to as employee record 200. Similar entries are provided for other employees. Other types of information may also be specified in entries 200. Note that the department entry 202B may only be stored once in directory server 108, but may be referenced by multiple employee entries 202A via department attribute 204E.

Figure 3B:
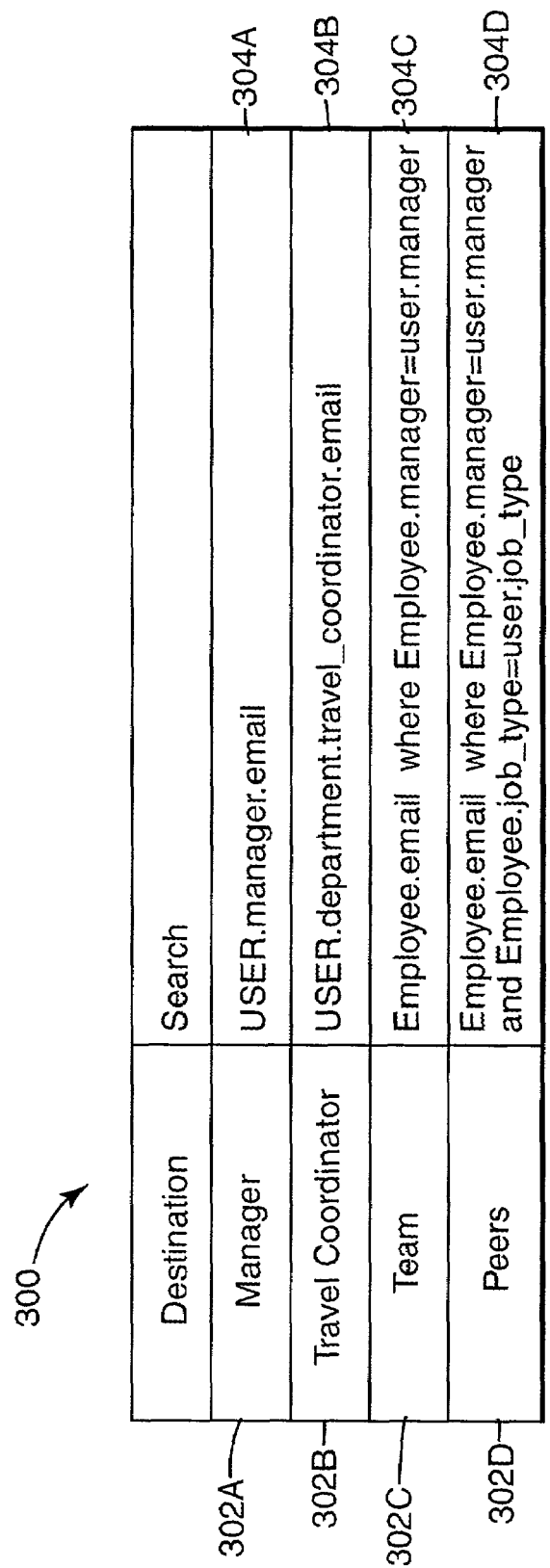
FIG. 3B illustrates mappings of user-relative destinations to action entries according to the present invention.

FIG. 3B illustrates mappings of user-relative destinations to action entries according to the present invention. Mapping table 300 is stored in memory 154 of address resolution device 104 (shown in FIG. 2). Mapping table 300 includes relative destination entries 302A–302D (collectively referred to as relative destination entries 302) and corresponding action entries 304A–304D (collectively referred to as action entries 304). Action entries 304 define actions to be taken by address resolution device 104 when a user enters a corresponding relative destination entry 302. In addition to specifying e-mail addresses for employees in directory server 108 and mapping table 300, fax telephone numbers may also be specified. Mapping table 300 is discussed in additional detail below with reference to FIGS. 4 and 5.

Figure 4:
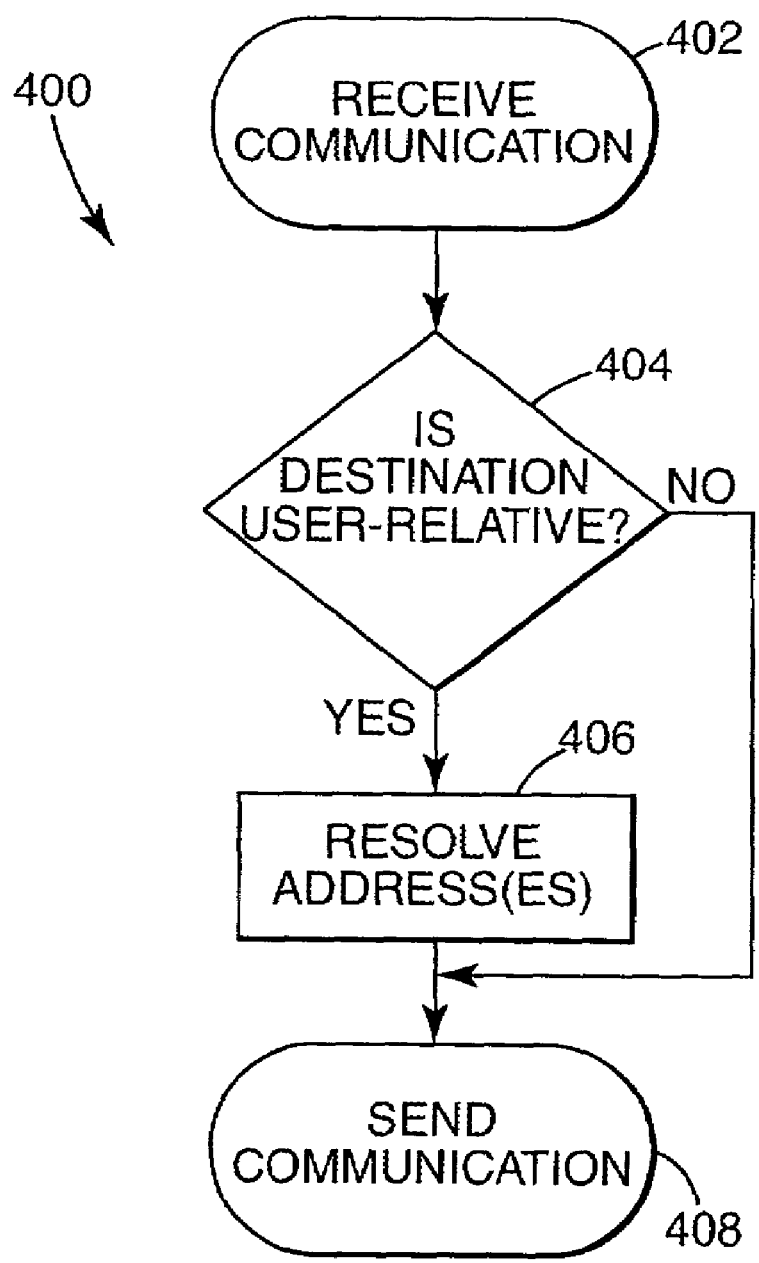
FIG. 4 illustrates a flow diagram of operations performed by the address resolution device according to the present invention.

FIG. 4 illustrates a flow diagram of operations performed by address resolution device 104 according to the present invention. Address resolving process 400 is stored in memory 154 of address resolution device 104 (shown in FIG. 2). The first step in process 400 is address resolution device 104 receiving a communication with user information and destination information from multi-function peripheral device 101. (Block 402). Processor 152 determines whether the destination information specifies a user-relative destination or an absolute destination. (Block 404). If the destination information specifies a user-relative destination, processor 152 resolves the user-relative destination (Block 406), as described below with reference to FIG. 5. After the user-relative destination is resolved, processor 152 converts the user-relative destination to one or more absolute destinations, and outputs the communication to network 100. (Block 408). If the destination information specifies an absolute destination (Block 404), processor 152 skips Block 406 of process 400, and outputs the communication to network 100 (Block 408).

Figure 5:
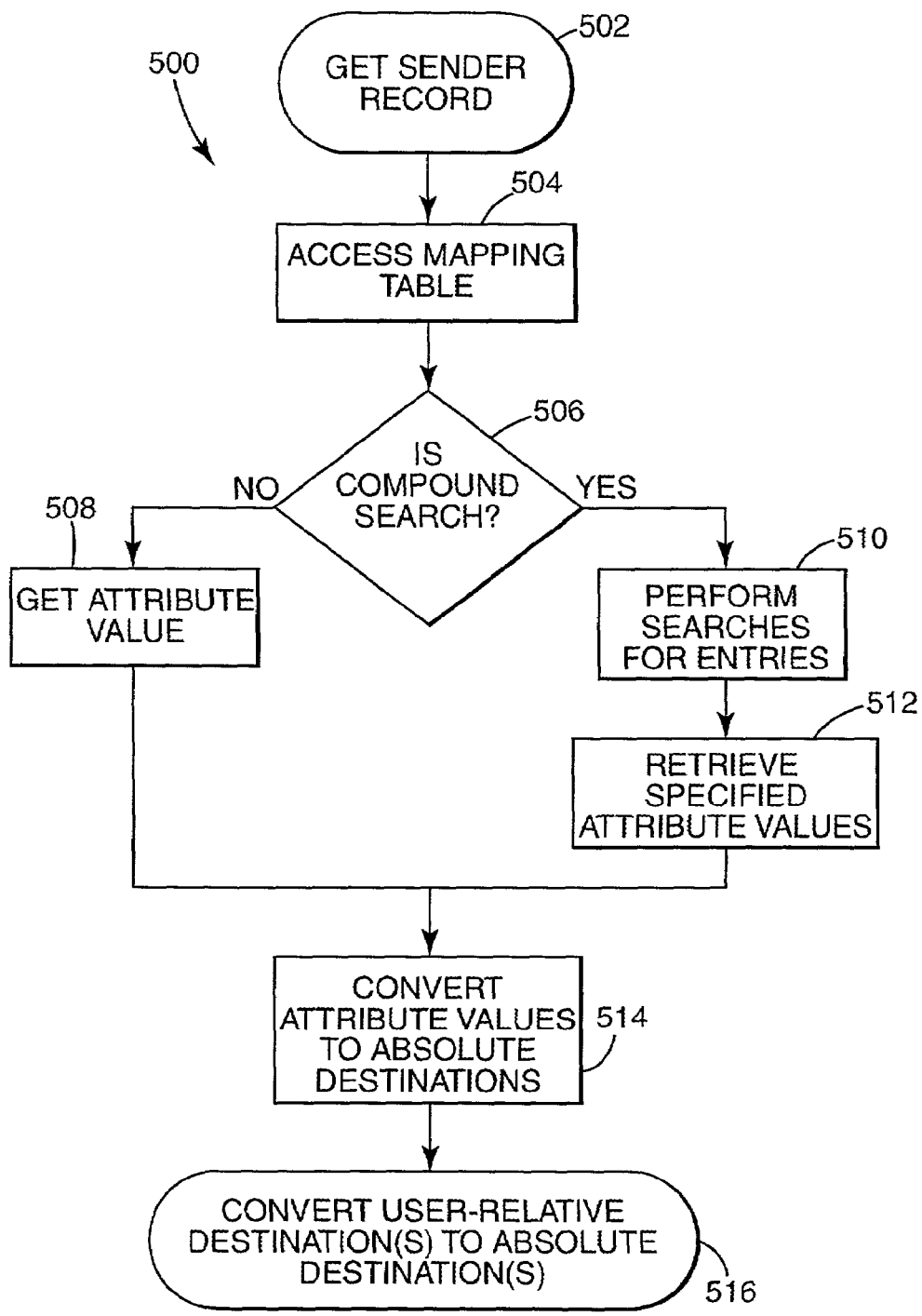
FIG. 5 illustrates a flow diagram of the address resolution step in the flow diagram of FIG. 4.

FIG. 5 illustrates a flow diagram 500 of the address resolution step (Block 406) of FIG. 4. Processor 152 uses the sender information in a received communication to obtain the sender's employee record 200 from directory server 108. (Block 502). Processor 152 accesses mapping table 300, identifies the relative destination entry 302 specified in the received destination information, and identifies the action entry 304 corresponding to the identified relative destination entry 302. (Block 504). Processor 152 determines whether the identified action entry 304 specifies a compound search. (Block 506). If the identified action entry 304 does not specify a compound search, processor 152 obtains the attribute value specified in the identified action entry 304 from the retrieved sender's employee record 200. (Block 508). Processor 152 then converts the retrieved attribute value to an absolute destination. (Block 514). In one embodiment, the absolute destination is obtained by searching directory server 108 based on the retrieved attribute value. If the identified action entry 304 specifies a compound search (Block 506), processor 152 performs the searches specified in the compound search (Block 510), and retrieves specified attribute values for each search (Block 512). Based on the retrieved attribute values, processor 152 obtains one or more absolute destinations. (Block 514). In one embodiment, the absolute destinations are obtained by searching directory server 108 based on the retrieved attribute values. As a last step, processor 152 converts the user-relative destination in a received communication to one or more absolute destinations. (Block 516).

Actions 304A–304B in mapping table 300 each specify a non-compound search. Action 304A is executed when a user specifies a "manager" relative destination. For action 304A, processor 152 performs the search "user.manager.email." The "user" field of the search indicates that the search should be performed in the retrieved sender's employee record 200. The "manager" field in the search indicates that the value of the manager attribute 204D in the sender's employee record 200 is to be obtained. The value in manager attribute 204D specifies the DN of the sender's manager. The "email" field in the search indicates that processor 152 is to obtain the value in email attribute 204C of the manager's employee record 200, which is identified by the manager's DN. Processor 152 accesses the manager's employee record 200 from directory server 108, and obtains the manager's e-mail address from the email attribute 204C of the manager's employee record 200.

Action 304B in mapping table 300 is executed when a user specifies a "travel coordinator" relative destination. For action 304B, processor 152 performs the search "user.department.travel_coordinator.email." The "user" field of the search indicates that the search should be performed in the retrieved sender's employee record 200. The "department" field in the search indicates that the department entry 202B in the sender's employee record 200 is to be searched. The "travel_coordinator" field in the search indicates that the value of the travel_coordinator attribute 204I is to be obtained. The value in travel_coordinator attribute 204I specifies the DN of the sender's travel coordinator. The "email" field in the search indicates that processor 152 is to obtain the value in email attribute 204C of the travel coordinator's employee record 200, which is identified by the travel coordinator's DN. Processor 152 accesses the travel coordinator's employee record 200 from directory server 108, and obtains the travel coordinator's e-mail address from the email attribute 204C of the travel coordinator's employee record 200.

Actions 304C–304D of mapping table 300 each specify a compound search. Action 304C is executed when a user specifies a "team" relative destination. For action 304C, processor 152 performs the search "employee.email" where "employee.manager=user.manager." Based on the "employee.manager=user.manager" search term, processor 152 accesses directory server 108 and identifies all employee records 200 that have a value in manager attribute 204D that is equal to the value in manager attribute 204D of the retrieved sender's employee record 200. Processor 152 identifies the DN of each such employee record 200. Based on the "employee.email" search term, processor 152 uses the identified DN's to access the corresponding employee records 200, and obtains the e-mail address from the email attribute 204C from each accessed employee record 200.

Action 304D of mapping table 300 is executed when a user specifies a "peers" relative destination. For action 304D, processor 152 performs the search "employee.email"

where "employee.manager=user.manager" and "employee.job_type=user.job_type." Based on the "employee.manager=user.manager" search term, processor 152 accesses directory server 108 and identifies all employee records 200 that have a value in manager attribute 204D that is equal to the value in manager attribute 204D of the retrieved sender's employee record 200. Processor 152 identifies the DN of each such employee record 200. Based on the "employee.job_type=user.job_type" search term, processor 152 uses the identified DN's to access the corresponding employee records 200, and identifies records 200 that have a value in job_type attribute 204F that is equal to the value in job_type attribute 204F of the sender's employee record 200. Based on the "employee.email" search term, processor 152 obtains the e-mail address from the email attribute 204C of each employee record 200 with the same value in job_type attribute 204 as the value in job_type attribute 204 of the sender's employee record 200.

It will be understood by a person of ordinary skill in the art that functions performed by address resolution device 104 may be implement in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory. In addition, it will be understood that the functionality of address resolution device 104 may be implemented in whole, or in part, inside multi-function peripheral device 101, rather than having a stand-alone device 104. In one embodiment, rather than receiving an entire communication including content information from multi-function peripheral device 101, address resolution device 104 only receives destination information and sender information from multi-function peripheral device 101, and provides multi-function peripheral device 101 with corresponding absolute destinations. It will also be understood by one of ordinary skill in the art that the techniques disclosed herein are not limited to e-mail and fax communications, but may be applied to any other network communications as well.

The user-relative addressing technique of the present invention provides a layer of indirection to the sending process. The layer of indirection provides all of the benefits normally associated with such a layer, including automatic updating of relative addressing information as the centralized data in the directory server changes. The invention provides a consistent interface to all users that want to send communications to the same user-relative destinations. In addition, the invention provides users the ability to send communications to desired destinations, even if the user does not know the appropriate e-mail addresses or fax phone numbers.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of providing sender-relative addressing in a computer network environment, the method comprising:
    associating a plurality of sender-relative destinations with a corresponding plurality of actions, wherein each of the sender-relative destinations is a non-absolute destination having an associated absolute destination that varies based on sender identity, and wherein each action specifies a plurality of search terms;
    receiving a first sender-relative destination for a communication via the computer network;
    receiving sender identification information via the computer network, the sender identification information identifying a sender of the communication;
    identifying a first action in the plurality of actions associated with the first sender-relative destination;
    performing a search of a directory server based on the search terms specified by the first action; and
    determining a first absolute destination for the communication based on the search terms specified by the first action and the sender identification information.

2. The method of claim 1, wherein the directory server stores a plurality of entries of different types, each entry including a plurality of attributes of different types, and wherein the determination of the first absolute destination is made by retrieving from the directory server the first absolute destination based on the search terms specified by the first action and the sender identification information.

3. The method of claim 2, wherein the directory server is an LDAP server.

4. The method of claim 1, wherein the sender identification information is an email address.

5. The method of claim 1, wherein the sender identification information is a user name.

6. The method of claim 1, wherein the first absolute destination is an email address.

7. The method of claim 1, wherein the first absolute destination is a plurality of email addresses.

8. The method of claim 1, wherein the first absolute destination is a fax phone number.

9. The method of claim 1, wherein the first absolute destination is a plurality of fax phone numbers.

10. The method of claim 1, and further comprising providing a mapping table that associates the plurality of sender-relative destinations with the corresponding plurality of actions.

11. A network device configured to be coupled to a computer network, the computer network having a directory server separate from the network device that stores a plurality of entries of different types, each entry including a plurality of attributes of different types, the network device comprising:
    a receiver for receiving a communication from the computer network, the communication including destination information and sender identification information;
    a memory for storing search information identifying searches terms associated with sender-relative destinations, each sender relative destination having a plurality of associated search terms, and wherein each of the sender-relative destinations is a non-absolute destination having an associated absolute destination that varies based on sender identity; and
    a controller coupled to the receiver and the memory, the controller configured to: process the destination information to identify a type of destination specified including identifying whether the destination information specifies a non-absolute sender-relative destination; perform at least one search of the directory server based on the stored search information and the sender identification information if the destination information specifies a sender-relative destination; and identify at least one absolute destination based on the search.

12. The network device of claim 11, wherein the memory stores a mapping table that includes the search information identifying searches terms associated with sender-relative destinations, and wherein the search terms for at least one of the sender-relative destinations include a plurality of search terms that are not email addresses.

13. The network device of claim 11, wherein the memory stores an address resolving process, and wherein the controller is configured to identify the at least one absolute destination based on information in the stored mapping table and in the stored address resolving process.

14. A computer-readable medium having computer-executable instructions for performing a method of providing sender-relative addressing in a computer network comprising:

associating a plurality of sender-relative destinations with a corresponding plurality of actions, wherein each of the sender-relative destinations is a non-absolute destination having an associated absolute destination that varies based on sender identity, and wherein each action specifies a plurality of hierarchical search terms, including at least one search term that is not an email address;

receiving a first sender-relative destination for a communication via the computer network;

receiving sender identification information via the computer network, the sender identification information identifying a sender of the communication;

identifying a first action in the plurality of actions associated with the first sender-relative destination;

performing a search of a directory server based on the search terms specified by the first action; and determining a first absolute destination for the communication based on the search terms specified by the first action and the sender identification information.

15. The medium of claim 14, wherein the directory server stores a plurality of entries of different types, each entry including a plurality of attributes of different types and wherein the determination of the first absolute destination is made by retrieving from the directory server the first absolute destination based on the search terms specified by the first action and the sender identification information.

16. The medium of claim 14, wherein the first absolute destination is a fax phone number.

17. The medium of claim 14, wherein the method further comprises providing a mapping table that associates the plurality of sender-relative destinations with the corresponding plurality of actions.

18. A method of providing user-relative addressing in a computer network, the method comprising:

receiving a communication from the comnuter network including destination information and sender identification information, the destination information including a first sender-relative destination;

processing the destination information to determine a type of destination specified, including determining whether the destination information specifies a non-absolute sender-relative destination that has an associated absolute destination that varies based on sender identity;

accessing a sender record based on the received sender identification information, the sender record including at least three different tpyes of attributes, including a name attribute for identifying a name of a sender and an email attribute for identifying an email address of the sender;

providing action information identifying a plurality of actions associated with a plurality of sender-relative destinations, wherein each action specifics a plurality of hierarchical search terms;

identifying a first action in the action information based on the received destination information, the first action associated with the first sender-relative destination;

identifying a first attribute in the sender record based on the first action and the received destination information; and determining a first absolute destination based on the first attribute.

19. The method of claim 18, wherein the network includes a directory server, and wherein the sender record is accessed from the directory server, and wherein the determination of the first absolute destination is made by retrieving from the directory server the first absolute destination based on the first attribute.

20. The method of claim 18, and further comprising providing a mapping table that associates the plurality of actions with the plurality of sender-relative destinations.

21. The method of claim 19, and further comprising:

accessing a plurality of employee records from the directory server based on the first action, each of the employee records includinig at least three different types of attributes, including a name attribute for identifying a name of an employee and an email attribute for identifying an email address of the employee;

comparing a first attribute in each employee record with the first attribute in the sender record;

identifying employee records with a first attribute that matches the first attribute of the sender's record;

determining a plurality of absolute destinations based on the identified employee records.

* * * * *

UNITED STATES PATENT AND TRADEMARK OFFICE
CERTIFICATE OF CORRECTION

PATENT NO. : 7,047,280 B2
APPLICATION NO. : 09/810281
DATED : May 16, 2006
INVENTOR(S) : John M. Hall et al.

It is certified that error appears in the above-identified patent and that said Letters Patent is hereby corrected as shown below:

In column 8, line 59, in Claim 11, delete "searches" and insert -- search --, therefor.

In column 9, line 10, in Claim 12, delete "searches" and insert -- search --, therefor.

In column 9, line 45, in Claim 15, delete "types" and insert -- types, --, therefor.

In column 10, line 3, in Claim 18, delete "comnuter" and insert -- computer --, therefor.

In column 10, line 14, in Claim 18, delete "tpyes" and insert -- types --, therefor.

In column 10, line 21, in Claim 18, delete "specifics" and insert -- specifies --, therefor.

In column 10, line 43, in Claim 21, delete "includinig" and insert -- including --, therefor.

Signed and Sealed this

Eleventh Day of August, 2009

David J. Kappos
*Director of the United States Patent and Trademark Office*